United States Patent
He

(10) Patent No.: US 9,137,660 B2
(45) Date of Patent: Sep. 15, 2015

(54) METHOD AND SYSTEM FOR AUTHENTICATION PROCESSING, 3GPP AAA SERVER AND USER EQUIPMENT

(75) Inventor: Chengdong He, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 347 days.

(21) Appl. No.: 13/176,217

(22) Filed: Jul. 5, 2011

(65) Prior Publication Data

US 2011/0265146 A1   Oct. 27, 2011

Related U.S. Application Data

(63) Continuation of application No. PCT/CN2009/075880, filed on Dec. 23, 2009.

(30) Foreign Application Priority Data

Jan. 5, 2009 (CN) ............. 2009 1 0001518
May 4, 2009 (CN) ............. 2009 1 0139346

(51) Int. Cl.
*H04L 29/06* (2006.01)
*H04W 12/06* (2009.01)

(52) U.S. Cl.
CPC .......... *H04W 12/06* (2013.01); *H04L 63/0892* (2013.01); *H04L 63/162* (2013.01)

(58) Field of Classification Search
CPC ... H04L 63/00; H04L 63/0892; H04L 63/162; H04W 12/06
See application file for complete search history.

(56) References Cited

U.S. PATENT DOCUMENTS 7,539,649 B2 * 5/2009 Guthery .................. 705/67
8,260,259 B2 * 9/2012 Semple et al. ............. 455/411

(Continued)

FOREIGN PATENT DOCUMENTS

CN 1266910 A 9/2000
CN 1770686 A 5/2006

(Continued)

OTHER PUBLICATIONS

J.Arkko and V. Lehtovirta, Improved Extensible Authentication Protocol Method for 3rd Generation Athentication and Key Agreement (EAP-AKA') draft-arkko-eap-aka-kdf-10 Nov. 18, 2008, Ericson, P.Eronen, Nokia,(Network Working Group), Internet-Draft Updates: 4187.*

(Continued)

*Primary Examiner* — Yin-Chen Shaw
*Assistant Examiner* — John B King
(74) *Attorney, Agent, or Firm* — Leydig, Voit & Mayer, Ltd.

(57) ABSTRACT

The present invention relates to a method and a system for authentication processing, a $3^{rd}$ Generation Partnership Project (3GPP) Authentication, and Authorization Accounting (AAA) server, and a User Equipment (UE). The method includes: receiving an authentication request message that carries authentication mode indication information; determining an authentication mode according to the authentication mode indication information; and performing authentication processing according to the authentication mode. The system for authentication processing includes the 3GPP AAA server and a network device which enables the UE to access the 3GPP AAA server through the network device. Through the method and the system for authentication processing, the 3GPP AAA server and the UE provided herein, the authentication request message sent by the UE carries the authentication mode indication information which has different parameter values so that the 3GPP AAA server can distinguish different authentication modes and perform the authentication processing according to the determined authentication mode.

6 Claims, 3 Drawing Sheets

(56) References Cited

U.S. PATENT DOCUMENTS

| | | | |
|---|---|---|---|
| 8,307,205 B2 * | 11/2012 | Cha et al. | 713/166 |
| 2005/0188218 A1 * | 8/2005 | Walmsley et al. | 713/200 |
| 2008/0026724 A1 * | 1/2008 | Zhang | 455/411 |
| 2008/0261596 A1 * | 10/2008 | Khetawat et al. | 455/436 |
| 2009/0061820 A1 * | 3/2009 | Patel et al. | 455/411 |
| 2010/0169954 A1 * | 7/2010 | Ogura | 726/4 |
| 2010/0190500 A1 * | 7/2010 | Choi et al. | 455/436 |

FOREIGN PATENT DOCUMENTS

| | | |
|---|---|---|
| CN | 1835436 A | 9/2006 |
| CN | 1848994 A | 10/2006 |
| CN | 101009919 A | 8/2007 |
| CN | 101052032 A | 10/2007 |
| CN | 101431508 A | 5/2009 |
| CN | 101772020 B | 12/2011 |
| WO | WO 2006/097041 A1 | 9/2006 |

OTHER PUBLICATIONS

J.Arkko and V. Lehtovirta, Improved Extensible Authentication Protocol Method for 3rd Generation Athentication and Key Agreement (EAP-AKA') draft-arkko-eap-aka-kdf-10 Nov. 18, 2008, Ericson, P.Eronen, Nokia,(Network Working Group), Internet-Draft Updates: 4187.*

"3rd Generation Partnership Project; Technical Specification Group Services and System Aspects; 3GPP System Architecture Evolution (SAE); Security aspects of non-3GPP accesses; (Release 8)", 3GPP TS 33.402 v8.2.1, Dec. 2008.*

First Chinese Office Action of Chinese Application No. 200910139346.9 mailed Dec. 10, 2010.

Second Chinese Office Action of Chinese Application No. 200910139346.9 mailed May 9, 2011.

3GPP, "3$^{rd}$ Generation Partnership Project; Technical Specification Group Services and System Aspects; 3GPP System Architecture Evolution (SAE); Security aspects of non-3GPP accesses (Release 10)", 3GPP TS 33.402, V10.0.0, pp. 1-47, (Dec. 2010).

International Search Report from the Chinese Patent Office in International Application No. PCT/CN2009/075880 mailed Apr. 8, 2010.

Wang et al; "Research on Security Architecture and Authentication Methods for Wireless Metropolitan Area Network"; Journal of Jiangsu University of Science and Technology (Natural Science Edition); Vo. 21, No. 5; pp. 76-79; Oct. 2007.

Written Opinion of the International Searching Authority from the Chinese Patent Office in International Application No. PCT/CN2009/075880 dated Mar. 23, 2010.

* cited by examiner

METHOD AND SYSTEM FOR AUTHENTICATION PROCESSING, 3GPP AAA SERVER AND USER EQUIPMENT

CROSS-REFERENCE TO RELATED APPLICATIONS

This application is a continuation of International Application No. PCT/CN2009/075880, filed on Dec. 23, 2009, which claims priority to Chinese Patent Application No. 200910001518.6, filed on Jan. 5, 2009 and Chinese Patent Application No. 200910139346.9, filed on May 4, 2009, all of which are hereby incorporated by reference in their entireties.

FIELD OF THE INVENTION

The present invention relates to mobile communications technologies, and in particular, to a method and a system for authentication processing, a $3^{rd}$ Generation Partnership Project (3GPP) Authentication, Authorization and Accounting (AAA) server, and a User Equipment (UE).

BACKGROUND OF THE INVENTION

In a 3GPP system, a function of an AAA server is: The AAA server receives an authentication request from a UE or a home device and then performs authentication and authorization for the UE or home device. FIG. 1 shows interfaces through which the UE accesses a 3GPP AAA server in the prior art. As shown in FIG. 1, when the UE accesses the 3GPP AAA server through the interfaces of different network devices, the interfaces support different authentication modes.

The Wa interface supports Extensible Authentication Protocol-Subscriber Identity Module (EAP-SIM) authentication or EAP-Authentication and Key Agreement (EAP-AKA) authentication.

The Wm interface supports EAP-SIM authentication based on Internet Key Exchange (IKE) V2 or EAP-AKA authentication based on IKE V2.

The SWm interface supports EAP-AKA authentication based on IKE V2.

The STa interface supports EAP-AKA' authentication, which may be regarded as a new authentication mode derived from the EAP-AKA authentication with a little modification.

The SWa interface supports EAP-AKA authentication or EAP-AKN authentication.

The S6b interface supports EAP-AKA authentication based on IKE V2.

The name of the interface between the Security Gateway (SeGW) and the 3GPP AAA server has not been defined, and this interface supports EAP-AKA authentication based on IKE V2.

In a roaming scenario, all the messages sent from the foregoing interfaces need to be forwarded by the Wd/SWd interface which exists between the 3GPP AAA proxy and the 3GPP AAA server. Therefore, the Wd/SWd interface supports all the authentication modes mentioned above.

In the process of implementing the present invention, the inventor finds at least these defects in the prior art: When the 3GPP AAA server supports authentication of all or part of the interfaces shown in FIG. 1 concurrently, some authentication modes are not identifiable to the 3GPP AAA server; the 3GPP AAA server is unable to identify the authentication mode after receiving the authentication request from such interfaces, and the authentication processing cannot go on.

SUMMARY OF THE INVENTION

The embodiments of the present invention provide a method and a system for authentication processing, a 3GPP AAA server and a UE so that the 3GPP AAA server can distinguish every authentication mode.

An aspect of the present invention provides a method for authentication processing. The method includes:
receiving an authentication request message that carries authentication mode indication information;
determining an authentication mode according to the authentication mode indication information; and
performing authentication processing according to the authentication mode.

Another aspect of the present invention provides a 3GPP AAA. server. The 3GPP AAA server includes:
a receiving module, configured to receive an authentication request message that carries authentication mode indication information;
a determining module, configured to determine an authentication mode according to the authentication mode indication information; and
an authentication processing module, configured to perform authentication processing according to the authentication mode.

Another aspect of the present invention provides a UE. The UE includes:
a message constructing module, configured to construct an authentication request message that carries authentication mode indication information; and
a sending module, configured to send the authentication request message constructed by the message constructing module to a 3GPP AAA server through a network device.

Another aspect of the present invention provides a system for authentication processing. The system includes: a 3GPP AAA server described above; and a network device, configured to enable a UE to access the 3GPP AAA server through the network device.

The foregoing technical solution shows that: Through the method and the system for authentication processing, the 3GPP AAA server and the UE provided herein, the authentication request message sent by the UE carries authentication mode indication information which has different parameter values so that the 3GPP AAA server can distinguish different authentication modes and perform the authentication processing according to the determined authentication mode.

DETAILED DESCRIPTION OF THE EMBODIMENTS

The technical solution under embodiments of the present invention is expounded below with reference to accompanying drawings. Evidently, the embodiments described below are exemplary only and not exhaustive. All other embodiments, which can be derived by those skilled in the art from the embodiments given herein without any creative effort, shall fall within the protection scope of the present invention.

Figure 2:
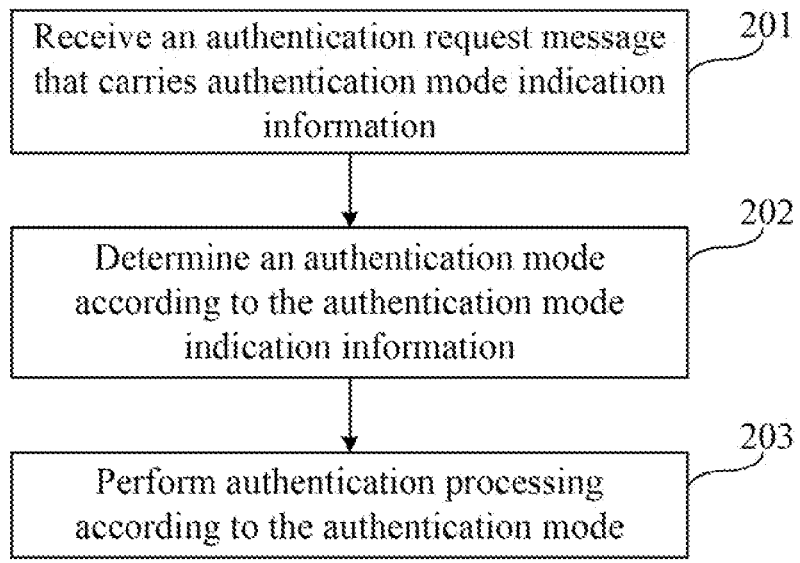
FIG. 2 is a schematic diagram of a method for authentication processing according to a first embodiment of the present invention.

FIG. 2 is a schematic diagram of a method for authentication processing according to a first embodiment of the present invention. As shown in FIG. 2, the method includes the following steps:

Step 201: Receive an authentication request message that carries authentication mode indication information.

Step 202: Determine an authentication mode according to the authentication mode indication information.

Step 203: Perform authentication processing according to the authentication mode.

Figure 1:
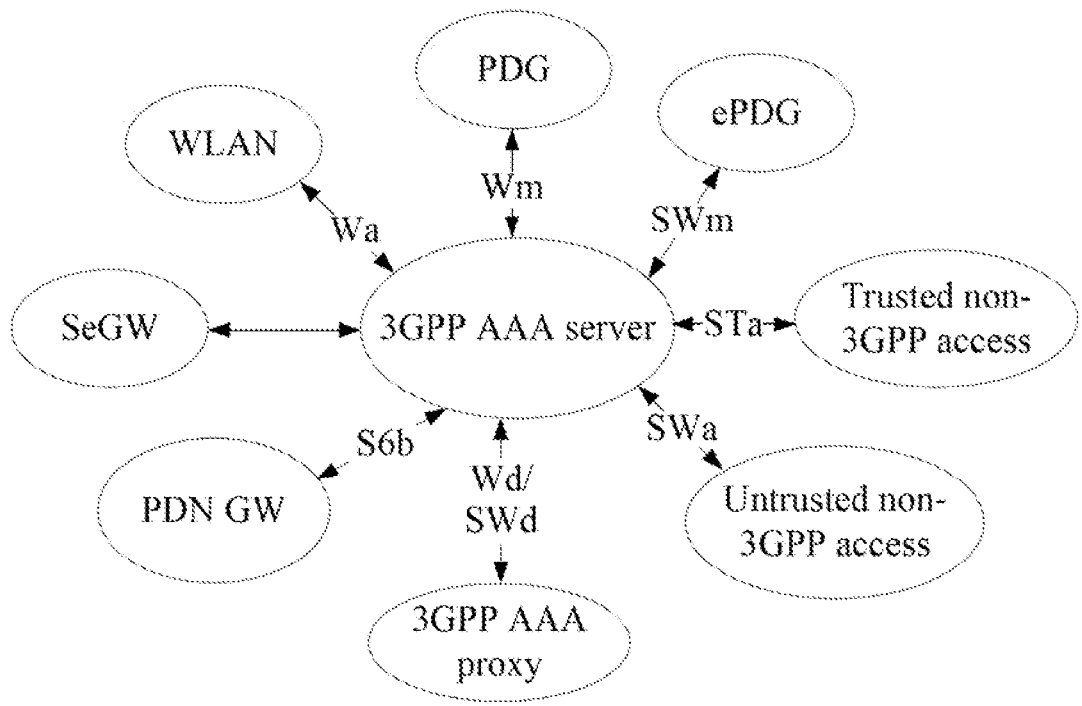
FIG. 1 is a schematic diagram of interfaces through which a UE accesses a 3GPP AAA server in the prior art.

The 3GPP AAA server receives the authentication request messages from the UE through the interfaces shown in FIG. 1. The authentication request message carries the authentication mode indication information. The authentication mode indication information may be a user identifier parameter in a Network Access Identifier (NAI) format, or a user-defined identifier parameter, or an access network identifier parameter, or an access network type parameter. According to different parameter values in the authentication mode indication information, the 3GPP AAA server determines the authentication mode indicated in the received authentication request message. The authentication mode may be: EAP-SIM authentication, EAP-AKA authentication, EAP-AKA' authentication, EAP-SIM authentication based on IKE V2, EAP-AKA authentication based on IKE V2, or authentication for a Home evolved NodeB (HeNB) or a Home NodeB (HNB) (such as device authentication or host part authentication). After determining the authentication mode, the 3GPP AAA server performs authentication according to the specific authentication mode.

Through the method for authentication processing provided in this embodiment, the authentication request message carries the authentication mode indication information which has different parameter values so that the 3GPP AAA server can distinguish different authentication modes and perform the authentication processing according to the determined authentication mode.

Figure 3:
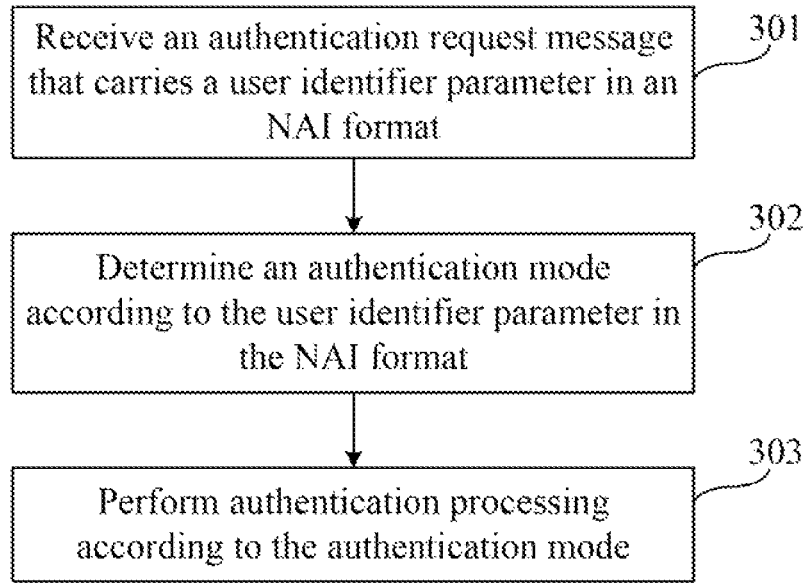
FIG. 3 is a schematic diagram of a method for authentication processing according to a second embodiment of the present invention.

FIG. 3 is a schematic diagram of a method for authentication processing according to a second embodiment of the present invention. As shown in FIG. 3, the method includes the following steps:

Step 301: Receive an authentication request message that carries a user identifier parameter in an NAI format.

The user identifier parameter in the NAI format is authentication mode indication information. This parameter is set in the following ways:

(1) For a Wireless Local Area Network (WLAN) such as the WLAN and Packet Data Gateway (PDG) shown in FIG. 1, the NAI format is:

0<IMSI>@wlan.mnc<MNC>.mcc<MCC>.3gppnetwork.org, which indicates EAP-AKA authentication; or 1<IMSI>@wlan.mric<MNC>.mcc<MCC>.3gppnetwork.org, which indicates EAP-SIM authentication; or 2<IMSI>@wlan.mnc<MNC>.mcc<MCC>.3gppnetwork.org, which indicates EAP-AKA authentication based on IKE V2; or 3<IMSI>@wlan.mnc<MNC>.mcc<MCC>.3gppnetwork.org, which indicates EAP-SIM authentication based on IKE V2.

(2) For an Evolved Packet System (Eps) such as the evolved PDG (ePDG), trusted 3GPP access gateway, non-trusted 3GPP access network, and Packet Data Network Gateway (PDN GW) shown in FIG. 1, the NAI format is:

0<IMS1>@epc.mnc<MNC>.mcc<MCC>.3gppnetwork.org, which indicates EAP-AKA authentication; or 1<IMSI>@epc.mnc<MNC>.mcc<MCC>.3gppnetwork.org, which indicates EAP-AKA' authentication; or 2<IMSI>@epc.mnc<MNC>.mcc<MCC>.3gppnetwork.org, which indicates EAP-AKA authentication based on IKE V2.

(3) For an H(e)NB, which is accessed through an SeGW in FIG. 1, the NAI format is:

2<IMSI>@HAP.mnc<MNC>.mcc<MCC>.3gppnetwork.org, which indicates EAP-AKA authentication based on IKE V2 or authentication for the H(e)NB.

It should be noted that the user identifier parameters in the NAI formats are examples of the authentication mode indication information rather than limitations to the authentication mode indication information. The authentication mode indication information may also be indicated by parameters in other formats.

Step 302: Determine an authentication mode according to the user identifier parameter in the NAI format.

Step 303: Perform authentication processing according to the authentication mode.

The following gives more details about the authentication processing corresponding to different authentication modes.

For the EAP-SIM authentication based on IKE V2, the authentication processing includes the following steps:

Step 3031a: Check whether an unused Authentication Vector (AV) exists in the 3GPP AAA server. If an unused AV exists in the 3GPP AAA server, proceed to step 3032a; if no unused AV exists in the 3GPP AAA server, proceed to step 3033a.

Step 3032a: Perform authentication processing through the unused AV. The procedure ends.

Step 3033a: Interact with a home serving device to obtain a new AV for performing authentication processing, where the home serving device may be a Home Location Register (HLR) or a Home Subscriber Server (HSS). The procedure ends.

For the EAP-AKA authentication based on IKE V2 or the authentication for the H(e)NB, the authentication processing includes the following steps:

Step 3031b: Check whether an unused AV exists in the 3GPP AAA server. If an unused AV exists in the 3GPP AAA server, proceed to step 3032b; if no unused AV exists in the 3GPP AAA server, proceed to step 3035b.

Step 3032b: Judge whether a separation bit of an Authentication Management Field (AMF) in the Authentication Token (AUTN) in the unused AV is set. If the separation bit is not set, namely, the value of the separation bit is 0, proceed to step 3033b; if the separation bit is set, proceed to step 3034b.

Each AV includes a random number (RAND), an expected response (XZES), a Ciphering Key (CK), an Integrity Key (IK), and an AUTN. At the time of calculating the AUTN, the AMF is used as an input parameter. One or more bits in the AMF are defined as separation bit(s). When the separation bit of the AMF is set, the value of the separation bit is 1; when the separation bit is not set, the value of the separation bit is 0.

Step 3033b: Perform authentication processing through the unused AV. The procedure ends.

Step 3034b: Perform exception handling. The procedure ends.

Step 3035b: When the 3GPP AAA server interacts with the home serving device, the 3GPP AAA server sends a first indication. The first indication indicates EAP-AKA authentication based on IKE V2 or authentication for the H(e)NB. The home serving device may be an HLR or an HSS.

Step 3036b: The home serving device generates a new AV according to the first indication and returns the new AV to the 3GPP AAA server. In the AUTN in the new AV, the separation bit of the AMF is not set, namely, the separation bit of the AMF is 0.

Step 3037b: The 3GPP AAA server obtains the new AV for authentication processing. The procedure ends.

In the EAP-SIM authentication based on IKE V2 or EAP-AKA authentication based on IKE V2 above, because the IKE protocol already provides security services such as encryption/authentication/replay prevention, the 3GPP AAA server does not require the UE to resend its identifier for authentication.

For the EAP-SIM authentication, the authentication processing includes the following steps:

Step 3031c: Obtain the user identifier from the UE again.

Step 3032c: Judge whether the obtained user identifier is the same as the user identifier in the authentication request message. If the obtained user identifier is the same as the user identifier in the authentication request message, proceed to step 3033c; if the obtained user identifier is not the same as the user identifier in the authentication request message, the procedure ends.

Step 3033c: Check whether an unused AV exists in the 3GPP AAA server. If an unused AV exists in the 3GPP AAA server, proceeds to step 3034c; if no unused AV exists in the 3GPP AAA server, proceed to step 3035c.

Step 3034c: Perform authentication processing through the unused AV. The procedure ends.

Step 3035c: Interact with the home serving device to obtain a new AV for performing authentication processing, where the home serving device may be an HLR or an HSS. The procedure ends.

For the EAP-AKA authentication, the authentication processing includes the following steps:

Step 3031d: Obtain the user identifier from the UE again.

Step 3032d: Judge whether the obtained user identifier is the same as the user identifier in the authentication request message. If the obtained user identifier is the same as the user identifier in the authentication request message, proceed to step 3033d; if the obtained user identifier is not the same as the user identifier in the authentication request message, the procedure ends.

Step 3033d: Check whether an unused AV exists in the 3GPP AAA server. If an unused AV exists in the 3GPP AAA server, proceed to step 3034d; if no unused AV exists in the 3GPP AAA server, proceed to step 3037d.

Step 3034d: Judge whether the separation bit of the AMF in the AUTN in the unused AV is set. If the separation bit is not set, namely, the value of the separation bit of the AMF is 0, proceed to step 3035d; if the separation bit is set, proceed to step 3036d.

Step 3035d: Perform authentication processing through the unused AV. The procedure ends.

Step 3036d: Perform exception handling. The procedure ends.

Step 3037d: Interact with the home serving device to obtain a new AV for performing authentication processing, where the home serving device may be an HLR or an HSS. The procedure ends.

For the EAP-AKA' authentication, the authentication processing includes the following steps:

Step 3031e: Obtain the user identifier from the UE again.

Step 3032e: Judge whether the obtained user identifier is the same as the user identifier in the authentication request message. If the obtained user identifier is the same as the user identifier in the authentication request message, proceed to step 3033e; if the obtained user identifier is not the same as the user identifier in the authentication request message, the procedure ends.

Step 3033e: Checks whether an unused AV exists in the 3GPP AAA server. If an unused AV exists in the 3GPP AAA server, proceed to step 3034e; if no unused AV exists in the 3GPP AAA server, proceed to step 3037e.

Step 3034e: Judge whether the separation bit of the AMF in the AUTN in the unused AV is set. If the separation bit is set, namely, the value of the separation bit of the AMF is 1, proceed to step 3035e; if the separation bit is not set, proceed to step 3036e.

Step 3035e: Perform authentication processing through the unused AV. The procedure ends.

Step 3036e: Performs exception handling. The procedure ends.

Step 3037e: When the 3GPP AAA server interacts with the home serving device, the 3GPP AAA server sends a second indication which indicates EAP-AKA' authentication. The home serving device may be an HLR or an HSS.

Step 3038e: The home serving device generates a new AV according to the second indication and returns the new AV to the 3GPP AAA server. In the AUTN in the new AV, the separation bit of the AMF is set, namely, the separation bit of the AMF is 1.

Step 3039e: The 3GPP AAA server obtains the new AV for authentication processing. The procedure ends.

Through the method for authentication processing provided in this embodiment, the authentication request message carries the authentication mode indication information which has different parameter values so that the 3GPP AAA server can distinguish different authentication modes and perform the authentication processing according to the determined authentication mode.

Figure 4:
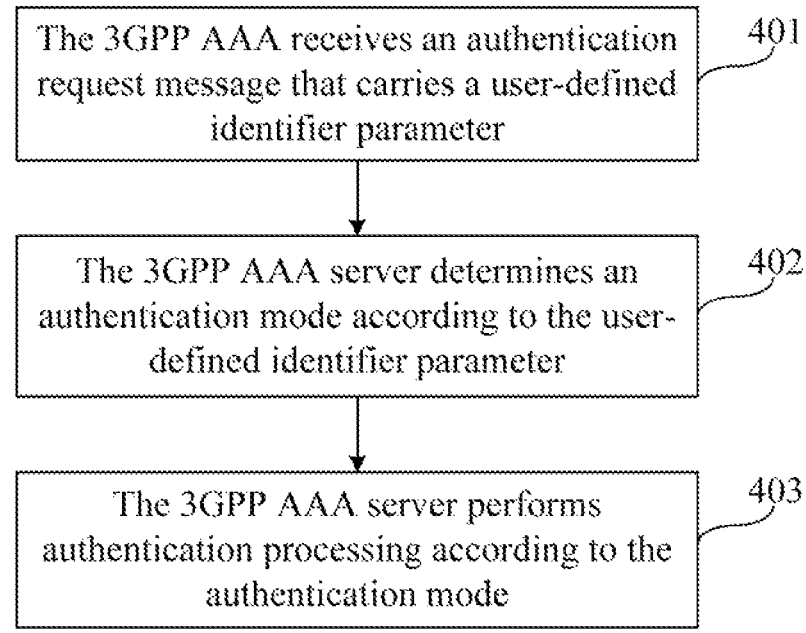
FIG. 4 is a schematic diagram of a method for authentication processing according to a third embodiment of the present invention.

FIG. 4 is a schematic diagram of a method for authentication processing provided in a third embodiment of the present invention. As shown in FIG. 4, the method includes the following steps:

Step 401: The 3GPP AAA server receives an authentication request message that carries a user-defined identifier parameter.

The user-defined identifier parameter is parameter information newly added to the authentication request message, and is used as authentication mode indication information. For example, the user-defined identifier parameter is located in a certain field of the authentication mode indication information, and the values of the parameter are: 0, which indicates EAP-AKA authentication; 1, which indicates EAP-SIM authentication; 2, which indicates EAP-AKA authentication based on IKE V2; 3, which indicates EAP-SIM authentication based on IKE V2; and 4, which indicates EAP-AKA' authentication.

Step 402: The 3GPP AAA server determines an authentication mode according to the user-defined identifier parameter.

Step 403: The 3GPP AAA server performs authentication processing according to the authentication mode.

The authentication processing according to the authentication mode in step 403 has been described in the embodiment above, and is not described herein again.

It should be noted that the authentication mode indication information may be indicated by a parameter in other formats. For example, if the authentication request message includes an access network identifier parameter or an access network type parameter, the EAP-AKA' authentication mode applies.

Besides, the 3GPP AAA server may check whether the authentication mode is the EAP-AKA' authentication mode according to a user identifier parameter and an access network identifier parameter in an NAI format in the authentication request message; or check whether the authentication mode is the EAP-AKA' authentication mode according to the user identifier parameter and the access network type parameter in the NAI format in the authentication request message.

Through the method for authentication processing provided in this embodiment, the authentication request message carries the authentication mode indication information which has different parameter values so that the 3GPP AAA server can distinguish different authentication modes and perform the authentication processing according to the determined authentication mode.

Figure 5:
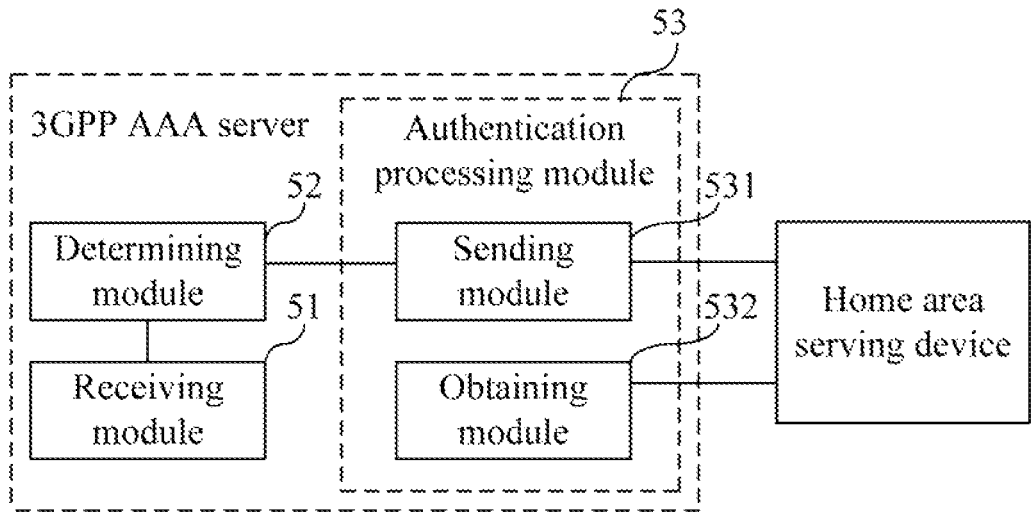
FIG. 5 is a schematic structural diagram of a 3GPP AAA server according to an embodiment of the present invention.

FIG. 5 is a schematic structural diagram of a 3GPP AAA server according to an embodiment of the present invention. As shown in FIG. 5, the 3GPP AAA server includes: a receiving module 51, configured to receive. authentication request message that carries authentication mode indication information; a determining module 52, configured to determine an authentication mode according to the authentication mode indication information received by the receiving module 51; and an authentication processing module 53, configured to perform authentication processing according to the authentication mode determined by the determining module 52.

The authentication mode indication information may be a user identifier parameter in an NAI format, or a user-defined identifier parameter, or an access network identifier parameter, or an access network type parameter.

The authentication mode is at least one of the authentication modes: EAP-SIM authentication, EAP-AKA authentication, EAP-AKA' authentication, EAP-SIM authentication based on IKE V2, EAP-AKA authentication based on IKE V2, and authentication for the H(e)NB.

If the at least one of the authentication modes includes EAP-AKA' authentication, EAP-AKA authentication based on IKE V2 or authentication for the H(e)NB, the authentication processing module 53 in the 3GPP AAA server may further include: a sending module 531, configured to send an indication to a home serving device when the 3GPP AAA server interacts with the home serving device, where the indication indicates EAP-AKA' authentication, EAP-AKA authentication based on IKE V2 or authentication for the H(e)NB; and an obtaining module 532, configured to obtain an AV from the home serving device and perform authentication processing, where the AV is generated by the home serving device according to the indication.

The authentication processing in this embodiment is performed by the 3GPP AAA server according to the determined authentication mode in the same way as the authentication processing described in the embodiment above.

Through the 3GPP AAA server provided in this embodiment, the authentication request message carries the authentication mode indication information which has different parameter values so that the 3GPP AAA server can distinguish different authentication modes and perform the authentication processing according to the determined authentication mode.

Figure 6:
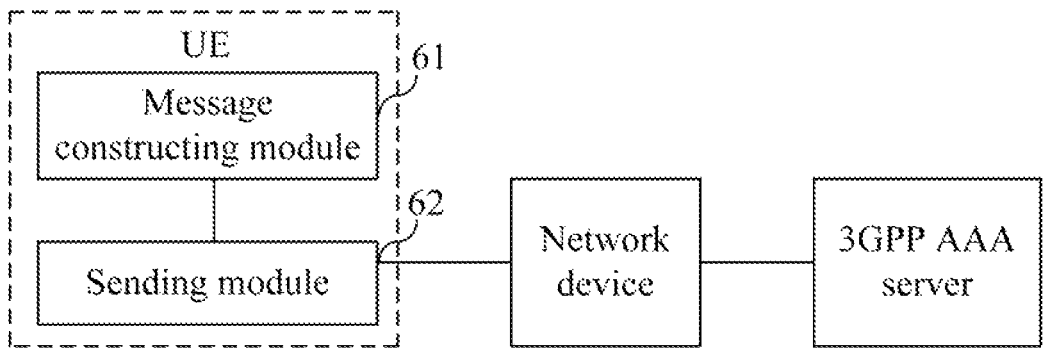
FIG. 6 is a schematic structural diagram of a UE according to an embodiment of the present invention.

FIG. 6 is a schematic structural diagram of a UE in an embodiment of the present invention. The UE includes: a message constructing module 61, configured to construct an authentication request message that carries authentication mode indication information; and a sending module 62, configured to send the authentication request message constructed by the message constructing module 61 to a 3GPP AAA server through a network device. The authentication mode indication information may be a user identifier parameter in an NAI format, or a user-defined identifier parameter, or an access network identifier parameter, or an access network type parameter.

The UE provided in this embodiment constructs the authentication request message, and sends the authentication request message to the 3GPP AAA server. The 3GPP AAA server determines the authentication mode and performs authentication processing according to the determined authentication mode. The detailed process has been described in the above embodiment of the method for authentication processing.

Through the UE provided in this embodiment, the authentication request message is constructed and sent to the 3GPP AAA server. The authentication request message carries authentication mode indication information so that the 3GPP AAA server can distinguish different authentication modes and perform the authentication processing according to the determined authentication mode.

Figure 7:
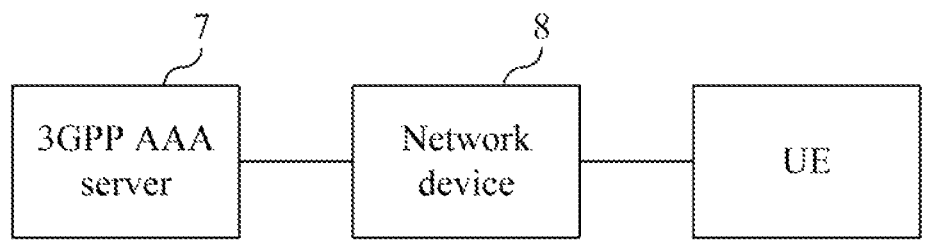
FIG. 7 is a schematic structural diagram of a system for authentication processing according to an embodiment of the present invention.

FIG. 7 is a schematic structural diagram of a system for authentication processing according to an embodiment of the present invention. As shown in FIG. 7, the system includes a 3GPP AAA server 7 illustrated in FIG. 5 and a network device 8 which is configured to enable a UE illustrated in FIG. 6 to access the 3GPP AAA server 7 through the network device 8. The network device 8 that accesses the 3GPP AAA server 7 and its interface may be included in the examples given in FIG. 1, and the network device 8 may be a PDG, an ePDG a trusted 3GPP access gateway, a non-trusted 3GPP access network, or an SeGW.

Through the system for authentication processing provided in this embodiment, the received authentication request message carries authentication mode indication information which has different parameter values so that the system for authentication processing can distinguish different authentication modes and perform the authentication processing according to the specific authentication mode.

Persons of ordinary skill in the art should understand that all or part of the steps of the method under the present invention may be implemented by a program instructing relevant hardware. The program may be stored in a computer readable storage medium. When the program runs, the steps of the method specified in any of the embodiments above can be performed. The storage medium may be a magnetic disk, a Compact Disk-Read Only Memory (CD-ROM), a Read Only Memory (ROM), or a Random Access Memory (RAM).

Finally, it should be noted that the above embodiments are merely provided for describing the technical solution of the present invention, but not intended to limit the present invention. It is apparent that persons skilled in the art can make various modifications and variations to the invention without departing from the scope of the invention. The present invention is intended to cover the modifications and variations provided that they fall within the scope of protection defined by the appended claims or their equivalents.

What is claimed is:

1. A method for authentication processing, comprising:
receiving from a user equipment (UE), by a $3^{rd}$ Generation Partnership Project (3GPP) Authentication, Authorization and Accounting (AAA) server, an authentication request message that carries authentication mode indication information indicating an Extensible Authentication Protocol-Authentication and Key Agreement (EAP-AKA') authentication mode, wherein the authentication mode indication information comprises an UE's first user identifier complying with a Network Access Identifier (NAI) format;
determining, by the 3GPP AAA server, the authentication mode applied to the UE is the EAP-AKA'authentication mode, according to a prefix in the UE's first user identifier complying with the NAI format;
obtaining, by the 3GPP AAA server, a second user identifier from the UE;
judging, by the 3GPP AAA server, whether the second user identifier is the same as the first user identifier in the authentication request message;
checking, by the 3GPP AAA server, whether an unused authentication vector (AV) is available with a value of a separation bit of authentication management field (AMF) of authentication token (AUTN) equal to 1, when the second user identifier is the same as the first user identifier in the authentication request message; and
performing, by the 3GPP AAA server, an EAP-AKA' authentication process through the unused AV, when the unused AV is available with the value of the separation bit of the AMF of the AUTN equal to 1.

2. The method of claim 1, wherein when no unused AV is available:
obtaining, a new AV by interacting with a home subscriber server (HSS); and
performing the authentication processing through the new AV.

3. The method of claim 2, wherein obtaining the new AV further comprises:
sending an indication message indicating the determined EAP-AKA' authentication mode to the HSS; and
receiving, from the HSS the new AV which is determined by the HSS according to the indication message.

4. A $3^{rd}$ Generation Partnership Project (3GPP) Authentication, Authorization and Accounting (AAA) server, comprising:
a processor;
a memory storing instructions, which, when executed by the processor, will cause the processor to:
receiving, from a user equipment (UE), an authentication request message that carries authentication mode indication information indicating an extensible Authentication Protocol-Authentication and Key Agreement (EAP-AKA') authentication mode, wherein the authentication mode indication information comprises an UE's first user identifier complying with a network access identifier (NAI) format;
determining, the authentication mode applied to the UE is the EAP-AKA' authentication mode according to a prefix in the UE's first user identifier complying with the NAI format;
obtaining a second user identifier from the UE;
judging whether the second user identifier is the same as the first user identifier in the authentication request message; and
checking whether an unused authentication vector (AV) is available with a value of a separation bit of authentication management field (AMF) of authentication token (AUTN) equal to 1, when the second user identifier is the same as the first user identifier in the authentication request message; and
performing an EAP-AKA' authentication process through the unused AV, when the unused AV is available with the value of the separation bit of the AMF of the AUTN equal to 1.

5. The 3GPP AAA server of claim 4, wherein when no unused AV is available the computer unit further performs:
obtaining a new AV by interacting with a home subscriber server (HSS), and perform the authentication processing through the new AV.

6. The 3GPP AAA server of claim 5, wherein obtaining the new AV further comprises:
sending an indication message indicating the determined EAP-AKA' authentication mode to the HSS, and receiving from the HSS the new AV which is determined by the HSS according to the indication message.

* * * * *